(No Model.)   3 Sheets—Sheet 1.
H. O. HEM.
HAY PRESS.
No. 532,060.   Patented Jan. 8, 1895.
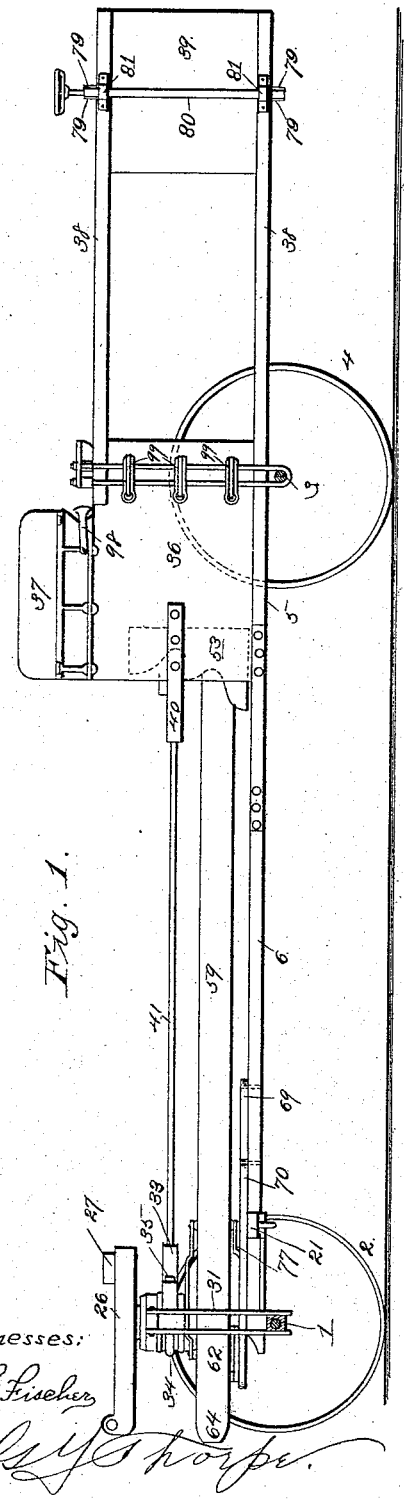
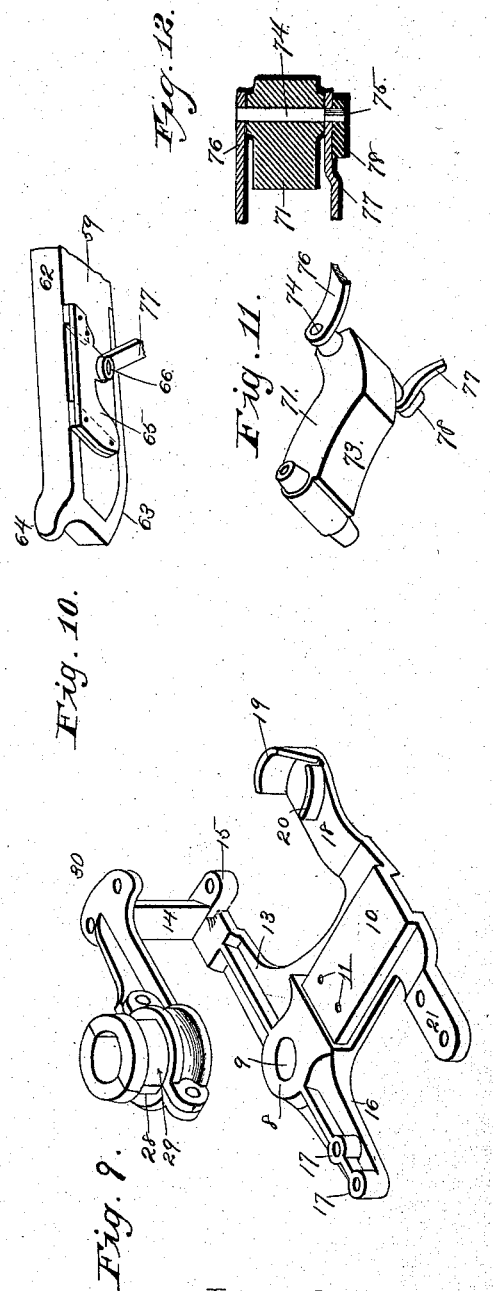
Witnesses:
F. G. Fischer
G. Y. Thorpe
Inventor
Halvor O. Hem,
By Higdon & Higdon
Attys.

(No Model.) 3 Sheets—Sheet 2.

H. O. HEM.
HAY PRESS.

No. 532,060. Patented Jan. 8, 1895.

Witnesses:
F. G. Fischer
G. Y. Thorpe

Inventor:
Halvor O. Hem
By Higdon & Higdon
Attys.

(No Model.)  3 Sheets—Sheet 3.

H. O. HEM.
HAY PRESS.

No. 532,060.  Patented Jan. 8, 1895.

Witnesses:
F. G. Fischer
G. W. Thorpe

Inventor:
Halvor O. Hem
By Higman & Higman
Attys.

UNITED STATES PATENT OFFICE.

HALVOR O. HEM, OF WYANDOTTE COUNTY, KANSAS.

HAY-PRESS.

SPECIFICATION forming part of Letters Patent No. 532,060, dated January 8, 1895.

Application filed July 16, 1894. Serial No. 517,678. (No model.)

*To all whom it may concern:*

Be it known that I, HALVOR O. HEM, of Wyandotte county, Kansas, have invented certain new and useful Improvements in Hay-Presses, of which the following is a full, clear, and exact description, reference being had to the accompanying drawings, forming a part hereof.

My invention relates to that class of baling-presses into the receiving chamber of which hay or other material to be baled is fed, and is carried by a reciprocating plunger into the compression chamber, wherein the bales are formed.

The objects of the invention are, first, to produce a power-mechanism whereby the pitman is caused to advance by a nearly direct longitudinal pressure or force, a distance considerably exceeding the length of the double power-arm or trip-lever, thereby obviating the heavy lateral strain on one side of the press which is endured by all the presses on the market, which acquire movement of the pitman by the power working against an incline of the pitman; second, to produce a generally improved construction whereby the opposite end of the compression chamber may be contracted or expanded laterally, and held yieldingly at any desired point of its adjustment, and, third, to produce an improved construction whereby the pitman, upon its rebound, is controlled so that there is a gradual stoppage of the plunger, and the strain and severe shock or jar incident to the recoil of the pitman of the ordinary machines is obviated.

With these objects in view, and others as hereinafter appear, the invention consists in certain peculiar and novel features of construction and combinations of parts, as hereinafter described and claimed.

Figure 2:
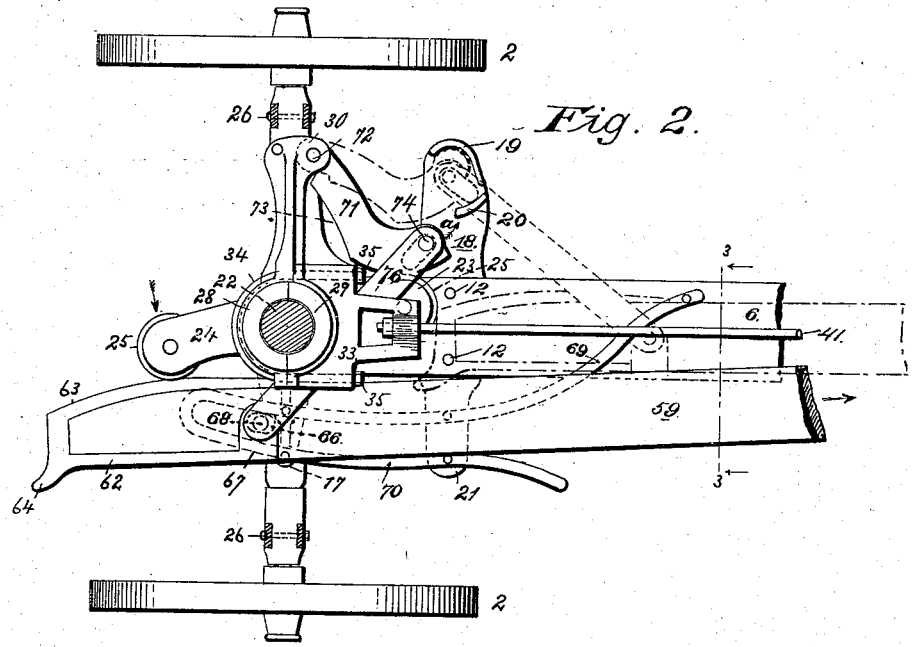
Figure 3:
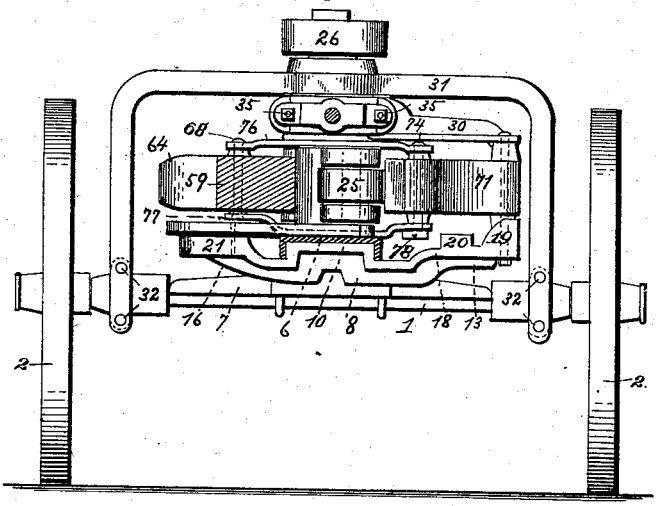
Figure 4:
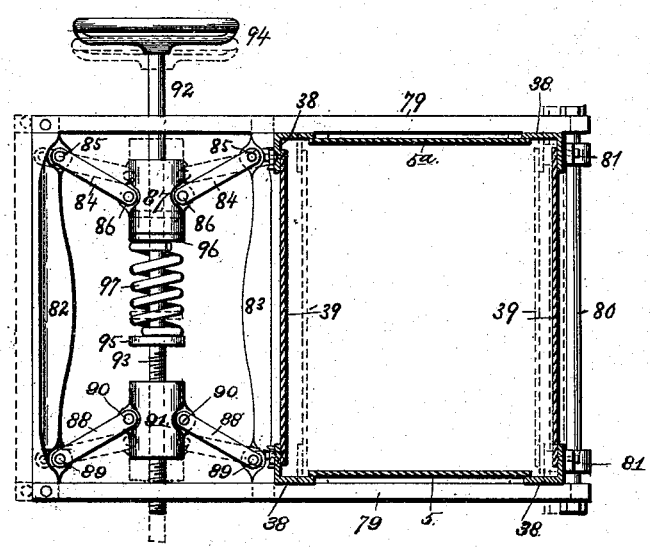
Figure 5:
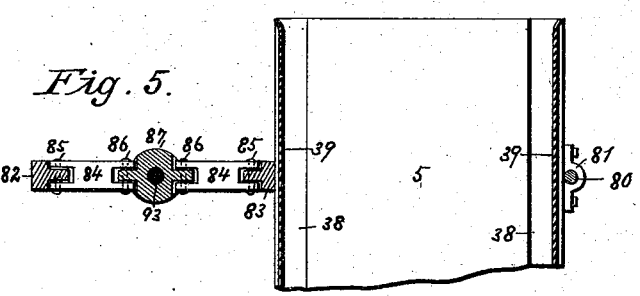
Figure 6:
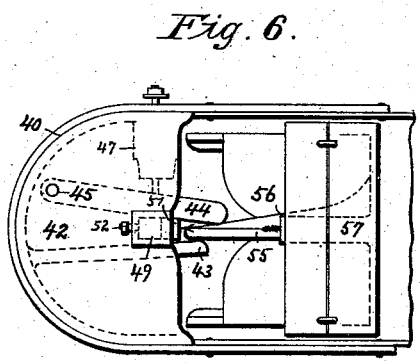
Figure 7:
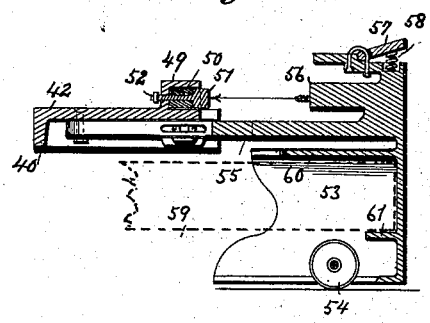
Figure 8:
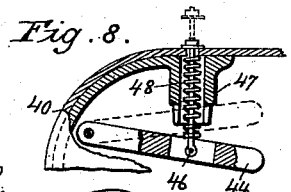

Referring to the drawings, which illustrate the invention, Figure 1. is a side elevation of a baling-press embodying my invention. Fig. 2. is a horizontal section on an enlarged scale, which shows a plan view of the power mechanism. Fig. 3. is a vertical sectional view taken on the line 3—3 of Fig. 2. Fig. 4. is a vertical sectional view of the compression chamber, showing the mechanism for contracting or expanding the same. Fig. 5. is a horizontal section of the same. Fig. 6. is a plan view of a portion of the receiving chamber of the press, showing therein the plunger and the mechanism for gradually stopping the same upon its recoil. Fig. 7. is a vertical central sectional view of the construction illustrated in Fig. 6. Fig. 8. is a horizontal sectional view of a portion of the same. Fig. 9. is a perspective view of the castings forming the journal of the power-shaft, and the support for the front end of the reach or bed-plate. Fig. 10. is a perspective view of the free end of the pitman, as viewed toward its under side. Fig. 11. is a detail perspective view of the auxiliary lever hereinafter referred to, and Fig. 12. is a vertical sectional view of the same.

In the said drawings, 1 designates the front axle, upon which are journaled in the ordinary manner the wheels 2.

3 designates the rear axle, upon which are journaled in the ordinary manner the wheels 4, and secured upon said axle in the usual or any other suitable manner, is the base-plate or bottom 5 of the press proper, and this plate is connected at its front end by the reach or bed-plate 6, preferably an inverted channel-iron, to the front portion of the machine, in a manner hereinafter explained. Secured by clip-bolts, or in any other suitable manner, rigidly upon the front axle, is the casting 7, which is rotatably mounted in and supports the casting 8. This casting 8 is provided with a vertical and cylindrical aperture 9 immediately over the center of the axle and extends rearwardly and longitudinally in the form of a rectangle 10, which rectangular portion supports and is embraced by the front end of the reach or bed-plate 6, and this rectangular portion 10 of the casting is provided with vertical holes 11, in which engage the bolts or pins 12, carried by and projecting through the reach or bed-plate. Projecting laterally to one side and above the axle, is an arm 13, which terminates at its outer end in the upwardly projecting arm 14, and the rearwardly projecting lug 15, and projecting from the opposite side of said casting and also above the axle, is an arm 16, which is provided with the bosses 17, having screw-threaded holes or apertures. Projecting from the opposite end of the casting, and parallel to and at the same side as the arm 13, is an arm 18, which is provided with the segmental flanges 19 and 20, the objects of which are hereinafter explained, and projecting from the opposite side and the same end of the casting, is an arm 21, which is provided with screw-threaded holes or apertures. Journaled vertically at its lower end in the cylindrical aperture 9, is the power-shaft 22, and projecting oppositely therefrom are the crank-arms 23 and 24, which form the double power-arm or trip-lever, and mounted to rotate horizontally in the bifurcated outer ends of said crank-arms, are anti-friction rollers 25, in the ordinary manner. The power-shaft, at its upper end, is formed with a casting 26, to which the sweep 27 is secured, in the ordinary manner. An annular collar is composed of semicylindrical castings 28 and 29, and fits snugly around the power-shaft above the trip-lever, and projecting laterally from the portion 28 of the said casting, is the arm 30, which is vertically above the arm 13, and is bolted or otherwise rigidly secured upon the upper end of the arm 14.

31 designates the arch, which consists of parallel plates or bars, embracing the annular collar formed by the castings 28 and 29, at their middle, and secured at their lower ends rigidly by the bolts 32 to blocks secured upon or cast integrally with the axle.

33 designates a casting or bracket, which is concaved at its front margin, and fits snugly against the casting 29, and is secured horizontally and rigidly in such position by the U-shaped bolt or clip 34, the arms of which extend through registering openings in the castings 28 and 29 and the block 33, and are engaged at their rear ends by the retaining-nuts 35.

The receiving chamber 36 of the baling-press is provided with the hopper 37, and with a feed opening, and the compression chamber, which forms a continuation of the receiving chamber, is formed by the angle-irons 38, the sides 39, rigidly carried thereby, the base-plate or bottom 5, and the top plate 5ª, corresponding to said base-plate or bottom.

40 designates the U-shaped plate or bar which is secured to and projects from the front end of the side-walls of the receiving chamber, and rigidly connecting said plate or bar to the bracket 33, is the tie-rod 41, of the ordinary construction and arrangement. A semicircular casting 42 fits and is bolted within the U-shaped plate or bar 40, and projecting longitudinally therefrom to the rear and at one side of its longitudinal center, is the bar 43. A bar 44 is also arranged longitudinally of and pivoted at 45, to the casting 42, and at the opposite side of its longitudinal center. The laterally extending rod 46 is pivoted to said bar 44 a suitable distance from its free end, and projects through a sleeve 47 formed integrally with and at the under side of the plate 42, and also through an aperture in the adjacent arm of the U-shaped plate 40, and is provided at its outer end with a nut or head which cannot pass through the hole in said plate 40. An expansion-spring 48 spirally surrounds the said rod and bears at its opposite ends against the plate 40 and the bar 44, so as to hold the same yieldingly in the position shown in full lines, Fig. 8. Vertically above the longitudinal center of the plate 42, and at its rear margin, is the sleeve 49, having its front end closed, and fitting snugly within said sleeve is a block or cushion 50 of elastic material. A bumper 51 is provided with the forwardly projecting stem, which extends centrally through the cushion 50, and the closed end of the sleeve, and is engaged at its outer end by the retaining-nut 52. The plunger 53 is mounted upon anti-friction rollers 54 in the ordinary manner, and is provided with the forwardly projecting wedge 55, which is longitudinally aligned with the space between the arms 43 and 44 hereinbefore described, and projecting forwardly also and located vertically above the wedge 55, is the bumper 56, which is longitudinally aligned with the bumper 51. A plate 57 is pivoted to the upper end of the plunger, and is held normally upward with a yielding pressure by the spring 58, and is adapted in the power movement of the pitman to bear against the top-wall of the receiving chamber, so as to prevent the hay or other material being baled from bunching in the upper part of the chamber. The pitman 59 is secured at its rear end to the plunger 53, between the flanges 60 and 61 thereof in any suitable manner, and at its free end is embraced by a casting 62, having a curved or inclined inner side 63, and the projection or horn 64 at its outer corner. A casting or plate 65 is secured to the under side of the pitman adjacent to its front end, and is provided with a depending guide-lug 66, and a casting 67 is arranged at the upper side of the pitman and is secured thereto by the vertical bolt 68, which, extending through the pitman, also engages the lug 66. A guide-way comprises a bar, which is bent to form the inner and outer arms 69 and 70, respectively, and these arms extend approximately parallel and toward the rear for a suitable distance, and then diverge. This guide-way is secured rigidly and permanently upon the arms 16 and 21 of the casting 8, by means of bolts which pass through perforations or apertures in the arms 69 and 70, and engage the screw-threaded holes or apertures of the bosses 17 and the arm 21.

71 designates an auxiliary lever, which is pivoted upon the bolt 72 between the arm 30 and the lug 15 of the arm 13, and this lever is provided with a concaved inner surface 73, which, when the said lever occupies its outward position, or that shown in dotted lines, Fig. 2, is concentric to the axis of the power-shaft, for a purpose hereinafter explained. A bolt 74 extends vertically through the lever 71, near its outer end, and is provided with the squared lower end 75. A link-plate 76 is pivotally mounted at one end upon the upper end of said bolt, and at its opposite end upon the upper end of the bolt 68, extending through the pitman. A companion link-plate 77 is secured upon the squared portion or lower end of said bolt, and at its opposite end is pivotally mounted upon the lower end of the bolt 68, and between the casting 65 and the lower side of the pitman, and below said link-plate at the end which engages the squared portion of the said bolt, is a longitudinally extending lug 78, which is carried rigidly by the lower end of said bolt, and is adapted to rotate therewith, for a purpose which is hereinafter explained. If desired, however, instead of forming the lower end of said bolt square, or by other means securing the link-plate 77 rigidly thereto, and providing a bolt with the lug 78, I may provide the link-plate 77 with a depending lug corresponding to the lug 78, and mount said link-plate rotatably upon the lower end of the bolt, and thus accomplish the object in view.

Referring now to the opposite end of the machine, 79 designates parallel cross-bars extending transversely of the top and bottom sides of the press, and these bars are secured rigidly or fixed in such position by the vertical tie-rod 80, which connects said bars at one side of the press, and is in turn carried by the bearings 81, secured to the corresponding angle-irons 38, and at their opposite ends and a suitable distance from the opposite wall of the press, by the vertical bar 82, which is bolted at its upper and lower ends between said bars 79, and also by the similar vertical bar 83, which is arranged vertically against the adjacent side of the press, and is bolted or otherwise rigidly secured to the corresponding angle-irons 38. A toggle-joint is formed by the downwardly convergent link-plates 84, which are pivotally bolted at 85 to the vertical bars 82 and 83, and are pivotally bolted at 86 to opposite sides of a vertical sleeve 87. A similar but oppositely disposed toggle-joint is formed by the upwardly converging link-plates 88, which are pivotally bolted at 89 to the vertical bars 82 and 83 near their lower ends, and are pivotally bolted at 90 to opposite sides of the vertically arranged sleeve 91; said sleeve being internally screw-threaded. A rod 92 extends vertically downward through the sleeves 87 and 91, and also extends between the upper and lower parts of the bars 79, and said rod is provided with a screw-threaded portion 93, which engages the internal threads of the sleeve 91, and is provided at its upper end with the hand-wheel 94, by which it is operated. A collar or enlargement 95 is rigidly carried upon the rod 92 at a point between the said sleeves, and a washer 96, loosely mounted upon said rod, is held yieldingly against the lower end of the collar 87 by the expansion-spring 97, which encircles the said rod and bears at its lower end upon the collar or enlargement 95. From this construction, it will be apparent that by rotating the hand-wheel 94 in the proper direction, the sleeves 87 and 91 will be moved farther apart, and thereby cause the side-walls carried by the angle-irons 38 to be moved toward each other, and that the expansion-spring 97, exerting its pressure against the collar rigidly carried by said rod and against the sleeve 87, loosely mounted upon said rod, will hold the baling-chamber yieldingly in such contracted position. By rotating the hand-wheel in the opposite direction, the sleeves 87 and 91 are caused to move toward each other to re-expand the discharge end of the compression-chamber.

When the pitman occupies the normal or inoperative position shown in Fig. 2, one arm of the trip-lever bears against the adjacent side of said pitman, and the other arm against the auxiliary lever 71 near its free end, and as the power-shaft is rotated in the direction indicated by the arrow, same figure, the anti-friction roller 25 carried by the arm 23 exerts its power against the lever 71, and causes the same to move pivotally outward in the direction indicated by the arrow a, and through the medium of the link-plates 76 and 77, to move the pitman nearly in a direct line to the rear. While this operation is taking place, the anti-friction roller 25 of the arm 24, of the trip-lever, swings an equal distance with the anti-friction roller 25 of the arm 23, but exerts little if any pressure against the inclined surface 63 of the pitman, owing to the fact that said pitman is moved more rapidly to the rear and slightly outward because the leverage is longer from the bolt 74 to the bolt 78 than from the axis of the power-shaft to the axis of the anti-friction roller of said arm 24. By the time that the anti-friction roller 25 of the arm 23 engages the outer end of the concave surface 73 of the lever 71, the said lever 71 has assumed the position shown in dotted lines, Fig. 2, and the anti-friction roller 25 of the arm 24, is in engagement with the end of the pitman. The continued rotation of the power-shaft now applies the power from the arm 24 directly upon the end of and forces said pitman in nearly a direct line to the rear, while the anti-friction roller 25 of the arm 23 travels upon the concave surface 73 of the lever 71, which surface at the same time is concentric with the axis of the power-shaft. By thus traveling upon said concave surface, the anti-friction roller of said arm, through the medium of the link-plates which pivotally operate with the bolt 74, prevents the power-shaft 24 forcing the pitman outward, and thus effectually allows the power to be applied upon the pitman without causing one side of the machine to sustain laterally the entire strain incident to this operation, as is the case with the ordinary machine of this type, and the flange 19 at the outer end of the arm 18 of the casting 8, prevents the lever 71 by any possibility swinging too far outward. As the lever 71 is forced, in the first part of the operation, to the position shown in dotted lines, Fig. 2, the elongated and depending portion 78 below the link-plate 77, swings therewith between the flanges 19 and 20, and as the link-plates pivotally operate with the bolt 74, which is squared for this purpose as hereinbefore described, during the second part of the operation, or that part when the power is applied by the arm 24, the said depending lug 78 is moved to the position shown in dotted lines, Fig. 2, adjacent to the inner side of the flange 20, and the link-plates and the free end of the pitman occupy the position shown in dotted lines, same figure, the lower link-plates clearing the upper margin of the flange 20 during the swinging operation. Before the pitman reaches the completion of its stroke, and as and after the anti-friction roller of the arm 23 clears the opposite end of the concaved surface of the lever 71, the tendency of the arm 24, engaging the pitman, is to force the same outward, but this is prevented, owing to the position of the lug 78, which engages the inner side of the flange 20, and prevents the inward movement of the lever 71, as will be understood. As the pitman begins its recoil movement, the depending guide-lug 66 bears against the inner arm 69 of the guide-way, and thereby throws the free end of the pitman outward and toward the proper side of the power-shaft, and this outward movement of the free end of the pitman is also insured because the link-plates pivotally connected thereto are prevented moving outward by reason of the flange 19, which limits the outward movement of the auxiliary lever 71, and the outward movement of said lever is also confined within the proper limits because the depending lug 78 of the pivot-bolt 74 prevents the auxiliary lever 71 swinging inward, by coming in contact with the inner flange 20, and said pitman is furthermore prevented swinging out too far by reason of the depending lug 66 coming in contact with the inner side of the outer arm 70 of the guide-way, and the inner and outer arms of said guide-way conjointly insure the free end of the pitman when the recoil is completed occupying the proper position relative to the trip-lever, as will be understood.

It will be apparent from the foregoing, that the pitman reciprocates in nearly a direct longitudinal line, and that in its power stroke and in the first portion of its recoil movement, it is guided mainly by the auxiliary lever and the link-plates connecting the same with the pitman, and by the flanges which prevent the auxiliary lever, after the pitman has reached a certain position, swinging either outward or inward, and that in the latter portion or termination of the recoil movement, the pitman is guided principally by the guide-way.

In order to lessen the shock or jar incident to the recoil of pitmen of this type, I have provided a construction illustrated in Figs. 6, 7 and 8, so that the same is gradually arrested, and not brought to a sudden and abrupt stop. As the pitman approaches the end of its recoil movement, the wedge 55 of the plunger enters the opening between the fixed arm 43 and the spring actuated arm 44, and overcoming the resistance offered by the spring 48, moves said bar 44 pivotally outward, and is gradually arrested. In case the spring 48 should offer insufficient resistance, the bumper 56 of the said plunger will come in contact with the bumper 51, the cushion 50 of which, yielding slightly, will deaden or lessen the shock or jar to the machine.

The press is also provided with the pivoted folder or tucker 98, which is adapted to fold or tuck all of the hay into the chamber, and with the retainer devices 99, which are adapted to prevent the bale following the pitman in its recoil. The folder and retaining devices are of the ordinary construction and arrangement, and it is not deemed necessary to illustrate them more clearly herein, as they form no part of my invention.

Having thus described my invention, what I claim as new, and desire to secure by Letters Patent, is—

1. In a baling-press, the combination with a suitable framework, a pitman, an auxiliary lever, and a link-plate pivotally connecting the said lever and the pitman, of a power shaft provided with oppositely projecting crank-arms, one of which in the rotation of the power-shaft engages and swings outward the said lever, and thereby partially operates the pitman, the other crank-arm then impinging directly upon the end of the pitman and actuating the same to complete its compression stroke.

2. In a baling-press, the combination with a suitable framework, a power-shaft mounted therein, and a trip-lever comprising a pair of arms projecting oppositely from said shaft, of a pitman, an auxiliary lever, link-plates pivotally connecting said pitman and said lever, and an arm of the framework provided with a flange in the path of said auxiliary lever, so as to limit the outward swing of the same, substantially as set forth.

3. In a baling-press, the combination with a suitable framework, a power-shaft mounted rotatably therein, and a trip-lever comprising a pair of arms projecting oppositely from said shaft, of a pitman, an auxiliary lever pivoted in the framework, link-plates pivotally connecting the pitman and the said lever, and an arm of the framework, having a flange projecting therefrom, which is adapted after the pitman has reached a certain point in its stroke, to prevent the inward swing or movement of said auxiliary lever, substantially as and for the purpose set forth.

4. In a baling-press, the combination with a suitable framework, a power-shaft mounted rotatably therein, and a trip-lever consisting of arms projecting oppositely from said shaft, of a pitman, an auxiliary lever pivoted in the framework, link-plates pivotally connecting said lever and the pitman, an arm of the framework provided with a flange to limit the outward movement of said lever, and a second flange projecting from said arm, and adapted, after the pitman has reached a certain point in its movement, to prevent the inward swing of said lever, substantially as set forth.

5. In a baling-press, the combination with a suitable framework, a power-shaft pivotally mounted therein, and a trip-lever, comprising arms projecting from opposite sides of said shaft, of a pitman, an auxiliary lever pivoted in the framework, a link-plate pivotally connecting the pitman and the said lever, an arm of said framework, having a flange projecting upwardly therefrom which has its upper surface in a plane slightly below the said link-plate, and an elongated lug below said link-plate and operating therewith, and adapted, after the pitman has reached a certain point in its movement, to come in contact with the inner side of said flange and thus prevent the inward movement of the auxiliary lever and the outward movement of the free end of the pitman, substantially as set forth.

6. In a baling-press, the combination with a suitable framework, a power-shaft mounted therein, and a trip-lever comprising a pair of arms projecting from opposite sides of said shaft, of a pitman, an auxiliary lever, a bolt mounted pivotally in the free end of the said lever, a link-plate pivotally connected to the pitman and mounted non-rotatably upon the said bolt, an arm of the framework, having a flange projecting upwardly therefrom and limiting the outward swing of said lever, and having an inner flange projecting also from said arm an elongated lug below the said link-plate and carried by the said bolt and adapted, after the pitman and link-plate have assumed certain positions, to come in contact with the inner side of the inner flange and prevent the inward movement of said lever and the consequent outward movement of the free end of the pitman, substantially as set forth.

7. In a baling-press, the combination with a suitable framework, a power-shaft operatively mounted therein and provided with oppositely projecting crank-arms, a pair of guide-arms 69 and 70, united at their front ends and diverging at their rear ends so as to form a guide-space therebetween and to one side of the power-shaft, an auxiliary lever at the opposite side of the power-shaft, a pitman, a pair of link-plates pivotally connected at their opposite ends to bolts carried by said auxiliary lever and pitman, a plate secured to the under side of the pitman and provided with a lug which depends between the said guide-arms, substantially as set forth.

8. In a baling-press, the combination with a suitable framework, secured to the discharge end of the compression-chamber, of a pair of sleeves, one of them internally screw-threaded, and a pair of converging link-plates pivotally connecting each sleeve to the said framework, a rod extending loosely through one of said sleeves and having a screw-threaded portion engaging the internal threads of the other, a fixed collar upon said rod, and a spring surrounding the rod and exerting its pressure against said fixed collar and loosely mounted sleeve, substantially as set forth.

9. In a baling-press, the combination with a suitable framework, secured to the discharge end of the compression-chamber, of a pair of sleeves, one of them internally screw-threaded, and a pair of converging link-plates pivotally connecting each sleeve to the said framework, a rod extending loosely through one of said sleeves and having a screw-threaded portion engaging the internal threads of the other, a fixed collar upon said rod, a spring surrounding the rod and exerting its pressure against said fixed collar and loosely mounted sleeve, and a hand-wheel mounted at the upper end of said rod so that when it is rotated in one direction the compression-chamber will be laterally contracted, and when it is rotated in the opposite direction the compression-chamber will be laterally expanded, substantially as set forth.

10. In a baling press, the combination with a pitman, a plunger mounted thereon and operating within the baling chamber, and a wedge 55, projecting forwardly from said plunger, of a U-shaped bar secured to the front end of the baling chamber casing, a casting 42 carried thereby and having a rearwardly projecting arm 43, a second arm 44, pivoted to said casting, a rod 46 pivoted thereto and extending laterally through an aperture in the said U-shaped bar, a retaining-nut engaging the projecting end of said rod, and a spring 48 spirally encircling the rod and bearing at its opposite ends against the U-shaped bar and the pivoted arm, substantially as described.

11. In a baling press, the combination with a pitman, a plunger mounted thereon and operating within the baling chamber, and a bumper 56 projecting forwardly from the plunger, of a U-shaped bar secured to the forward end of the baling-chamber casing, a casting 42 carried thereby and provided with a sleeve 49, having its front end closed, a bumper 51, fitting in said sleeve and provided with a stem which extends through an aperture in the closed end of the sleeve, a nut 52 engaging the projecting end of said stem, and an elastic block surrounding circumferentially said stem and interposed between the closed end of said sleeve and the opposing end of the bumper 51, substantially as described.

In testimony whereof I affix my signature in presence of two witnesses.

HALVOR O. HEM.

Witnesses:
H. N. STRAIT,
G. Y. THORPE.